(12) United States Patent
Budampati et al.

(10) Patent No.: US 8,929,228 B2
(45) Date of Patent: Jan. 6, 2015

(54) LATENCY CONTROLLED REDUNDANT ROUTING

(75) Inventors: Ramakrishna S Budampati, Plymouth, MN (US); Patrick S Gonia, Maplewood, MN (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 2899 days.

(21) Appl. No.: 10/882,561

(22) Filed: Jul. 1, 2004

(65) Prior Publication Data

US 2006/0002368 A1 Jan. 5, 2006

(51) Int. Cl.
- *G01R 31/08* (2006.01)
- *H04W 40/24* (2009.01)
- *H04L 12/751* (2013.01)
- *H04L 12/707* (2013.01)

(52) U.S. Cl.
CPC ............ *H04W 40/246* (2013.01); *H04L 45/02* (2013.01); *H04L 45/22* (2013.01)
USPC ........... 370/252; 370/400; 370/408; 370/216; 370/256

(58) Field of Classification Search
USPC ......... 370/400, 408, 216, 256, 351, 389, 252, 370/338, 254, 238
See application file for complete search history.

(56) References Cited

U.S. PATENT DOCUMENTS

| | | |
|---|---|---|
| 4,367,458 A | 1/1983 | Hackett |
| 4,611,198 A | 9/1986 | Levinson et al. |
| 4,630,035 A | 12/1986 | Stahl et al. |
| 4,737,770 A | 4/1988 | Brunius et al. |
| 4,803,487 A | 2/1989 | Willard et al. |
| 4,912,461 A | 3/1990 | Cenzano, Jr. et al. |
| 4,970,714 A | 11/1990 | Chen et al. |
| 5,134,644 A | 7/1992 | Garton et al. |
| 5,365,217 A | 11/1994 | Toner |
| 5,487,068 A | 1/1996 | Smolinske et al. |
| 5,625,651 A | 4/1997 | Cioffi |
| 5,717,688 A | 2/1998 | Belanger et al. |
| 5,719,883 A | 2/1998 | Ayanoglu |

(Continued)

FOREIGN PATENT DOCUMENTS

| | | |
|---|---|---|
| EP | 0388756 A2 | 9/1990 |
| EP | 0407776 A2 | 1/1991 |

(Continued)

OTHER PUBLICATIONS

G.P. Nizzoli, Redundant Transmission Using Internet Protocol Version 6, IEEE 2003.*

(Continued)

*Primary Examiner* — Kibrom T Hailu
(74) *Attorney, Agent, or Firm* — Schwegman Lundberg & Woessner, P.A.

(57) ABSTRACT

Redundant, non-overlapping paths or routes for a sensor signal in a mesh network are selected based on predetermined metrics. In one embodiment, a wireless sensor transmits a signal that is received by two separate infrastructure nodes. The signal is retransmitted by the two intermediate nodes via the selected non-overlapping routes to a controller node. Routes are identified for at least two infrastructure nodes that receive signals from an added sensor. Performance metrics are calculated for each route. The two routes with the best performance metrics are selected in one embodiment.

28 Claims, 2 Drawing Sheets

(56) References Cited

U.S. PATENT DOCUMENTS

| | | | |
|---|---|---|---|
| 5,751,708 A | 5/1998 | Eng et al. | |
| 5,805,578 A * | 9/1998 | Stirpe et al. | 370/255 |
| 5,845,202 A | 12/1998 | Davis | |
| 5,870,391 A | 2/1999 | Nago | |
| 6,058,137 A | 5/2000 | Partyka | |
| 6,542,469 B1 * | 4/2003 | Kelley et al. | 370/238 |
| 6,628,607 B1 * | 9/2003 | Hauck et al. | 370/216 |
| 6,640,243 B1 * | 10/2003 | Phillips et al. | 709/206 |
| 6,751,731 B1 | 6/2004 | Binding et al. | |
| 6,751,746 B1 * | 6/2004 | Jain et al. | 714/4.12 |
| 6,813,272 B1 * | 11/2004 | An et al. | 370/395.21 |
| 7,085,241 B1 * | 8/2006 | O'Neill et al. | 370/254 |
| 7,280,545 B1 * | 10/2007 | Nagle | 370/400 |
| 2002/0054574 A1 | 5/2002 | Beach et al. | |
| 2003/0001775 A1 | 1/2003 | Turner | |
| 2003/0021231 A1 * | 1/2003 | Evans | 370/230 |
| 2003/0095504 A1 * | 5/2003 | Ogier | 370/235 |
| 2004/0023617 A1 * | 2/2004 | Mahany et al. | 455/41.1 |
| 2004/0042473 A1 * | 3/2004 | Park et al. | 370/408 |
| 2004/0137915 A1 | 7/2004 | Diener et al. | |
| 2004/0146007 A1 * | 7/2004 | Saadawi et al. | 370/238 |
| 2004/0186696 A1 * | 9/2004 | Alicherry et al. | 703/1 |
| 2005/0078674 A1 | 4/2005 | Koide et al. | |
| 2005/0083848 A1 * | 4/2005 | Shao et al. | 370/238 |
| 2005/0152390 A1 * | 7/2005 | Schroeder et al. | 370/432 |
| 2006/0184977 A1 | 8/2006 | Mueller et al. | |
| 2006/0195629 A1 | 8/2006 | Sharma et al. | |
| 2006/0227729 A1 | 10/2006 | Budampati et al. | |

FOREIGN PATENT DOCUMENTS

| | | |
|---|---|---|
| EP | 0496607 A1 | 7/1992 |
| EP | 0522200 A2 | 1/1993 |
| EP | 0714081 A1 | 5/1996 |
| EP | 0772168 A2 | 5/1997 |
| GB | 2016770 A | 9/1979 |
| GB | 2235316 A | 2/1991 |
| WO | WO-93/13507 A1 | 7/1993 |
| WO | WO-97/02677 A2 | 1/1997 |
| WO | WO-97/24840 A1 | 7/1997 |
| WO | WO-9749197 | 12/1997 |
| WO | WO-9749197 A1 | 12/1997 |
| WO | WO-0111833 A1 | 2/2001 |
| WO | WO-2004112403 | 12/2004 |
| WO | WO-2004112403 A2 | 12/2004 |

OTHER PUBLICATIONS

"U.S. Appl. No. 11/103,982 Non-Final Office Action mailed Jan. 22, 2008", OARN,16 pgs.

"U.S. Appl. No. 11/103,982, Response filed Apr. 22, 2008 to Non-Final Office Action mailed Jan. 22, 2008", 11 pgs.

"U.S. Appl. No. 11/103,982, Response filed Oct. 8, 2008 to Final Office Action mailed Aug. 8, 2008.", 9.

"U.S. Appl. No. 11/103,982 Final Office Action mailed Aug. 8, 2008", FOAR, 21 pgs.

"U.S. Appl. No. 11/103,982, Final Office Action mailed Feb. 2, 2010", 25 pgs.

"U.S. Appl. No. 11/103,982, Non-Final Office Action mailed Jan. 5, 2009", 22 pgs.

"U.S. Appl. No. 11/103,982, Non-Final Office Action mailed Jul. 14, 2009", 19 pgs.

"U.S. Appl. No. 11/103,982, Pre-Appeal Brief Request mailed Mar. 18, 2010", 5 pgs.

"U.S. Appl. No. 11/103,982, Response filed dOct. 12, 2009 to Non Final Office Action mailed Jul. 14, 2009", 11 pgs.

"Application Serial No. 256.195US1, Response filed Apr. 6, 2009 to Non Final Office Action mailed Jan. 5, 2009", 11 pgs.

"European Application Serial No. 05769065.3, Response Filed Oct. 5, 2012 to Office Action mailed Jul. 5, 2012", 9 pgs.

"European Application Serial No. 05769065.3, Office Action mailed Jun. 5, 2012", 4 pgs.

"European Application Serial No. 05769065.3, Office Action mailed Oct. 15, 2012", 8 pgs.

"European Application Serial No. 05769065.3, Response filed Feb. 14, 2013 to Examination Notification Art. 94(3) mailed Oct. 15, 2012", 8 pgs.

"European Application Serial No. 06739050., Office Action mailed May 3, 2010", 6 pgs.

"European Application Serial No. 06739050.0, Office Action Response Filed Sep. 3, 2010", 8 pgs.

"U.S. Appl. No. 11/103,982, Examiner's Answer mailed Sep. 22, 2010", 36 pgs,.

"U.S. Appl. No. 11/103,982, Appeal Brief filed Jun. 24, 2010", 22 pgs.

"U.S. Appl. No. 11/103,982, Appeal Decision mailed Sep. 26, 2013", 7 pgs.

"U.S. Appl. No. 11/103,982, Decision from Pre-Appeal Brief Review mailed May 25, 2010", 2 pgs.

"U.S. Appl. No. 11/103,982, Reply Brief filed Nov. 10, 2010", 4 pgs.

* cited by examiner

LATENCY CONTROLLED REDUNDANT ROUTING

FIELD OF THE INVENTION

The present invention relates to robust routing in wireless networks, and in particular to latency control and fault containment in redundant wireless route determination.

BACKGROUND OF THE INVENTION

Wireless leaf nodes, such as sensors are networked via multiple infrastructure nodes that communicate with a central controller. The sensors operate at low power to conserve batteries, and increase the time period in which batteries need to be replaced. This implies that the radio frequency (RF) signal generated by a sensor will have extremely low signal strength. The infrastructure nodes are placed throughout the network of sensors and they relay the data from the sensors to the central controller. The infrastructure nodes may be line powered and they may communicate with each other and with the controller at higher signal strength and also at a higher data rate. The RF links between the leaf nodes and the infrastructure nodes as well as the RF links between the infrastructure nodes are highly susceptible to interference and propagation effects, especially in indoor wireless environments. These effects adversely affect the reliability of the entire wireless network.

Robust wireless communication, in the presence of electromagnetic interference (EMI), along with low power consumption by battery powered sensor nodes are important considerations for designing wireless sensor networks for industrial applications. For the proper functioning of the industrial application, the data from the sensors has to be delivered reliably and in a timely manner to the central controller.

SUMMARY OF THE INVENTION

Redundant, non-overlapping paths or routes for a wireless leaf node signal in a mesh network are selected, taking into account predetermined metrics of each route. In one embodiment, a wireless leaf node transmits a signal that is received by two separate infrastructure nodes in the mesh network. The signal is retransmitted by the two infrastructure nodes via the selected non-overlapping routes to a controller node.

Many signal routes to the controller may be discovered or identified when a leaf node is added to the network. Routes are identified for at least two infrastructure nodes that receive signals from the added leaf node. Performance metrics are calculated for each route. The two routes with the best performance metrics are selected in one embodiment.

In one embodiment the performance metrics include bandwidth utilization percentage of the infrastructure nodes on the path. Further metrics may include number of hops in the path and cumulative RF link quality of the entire path.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system. Implementation of the functions may be distributed between different components in a network.

Figure 1:
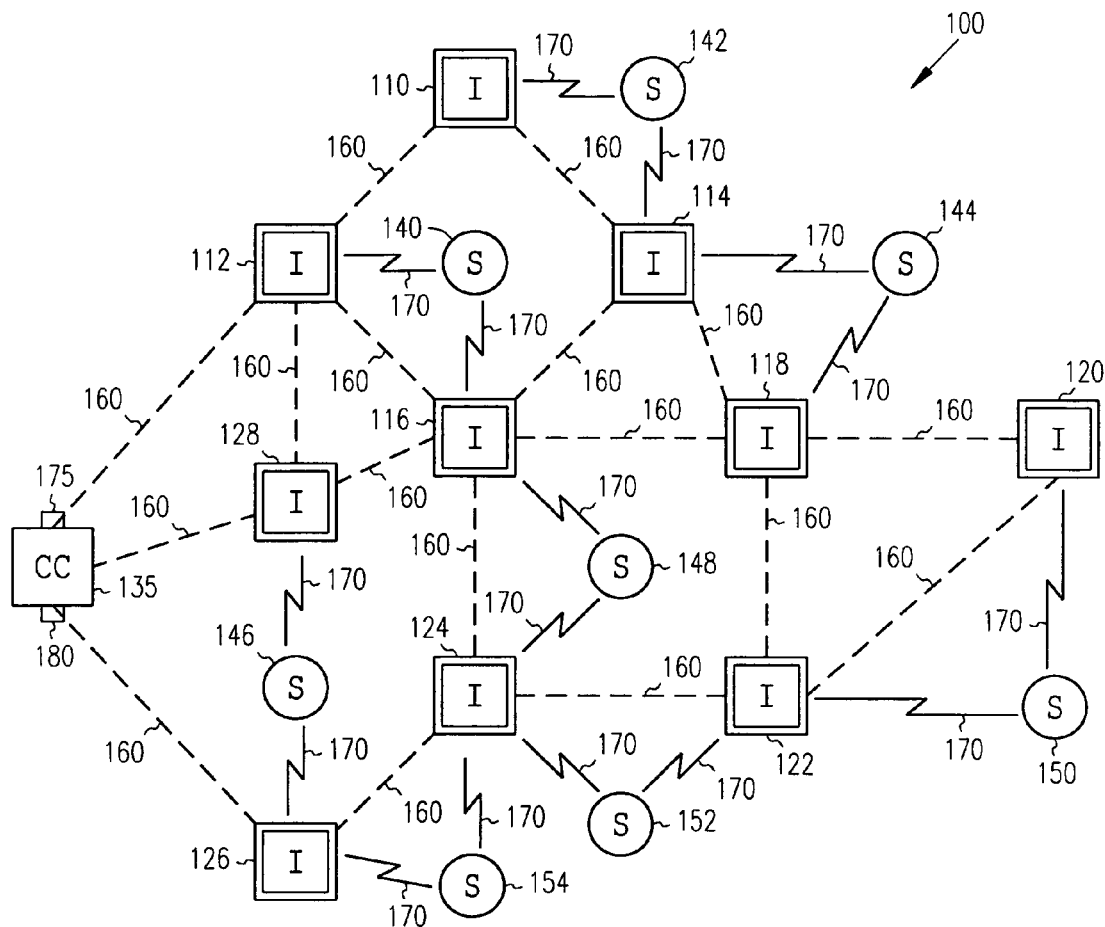
FIG. 1 is a block diagram of a wireless mesh network according to an embodiment of the invention.

FIG. 1 shows a wireless network generally at 100. The wireless network in one embodiment comprises a number of intermediate nodes 110, 112, 114, 116, 118, 120, 122, 124, 126 and 128, also referred to as infrastructure nodes. The infrastructure nodes are coupled to a central control 135 through gateways 175 and 180. Associated with the infrastructure nodes are a plurality of wireless nodes 140, 142, 144, 146, 148, 150, 152, and 154. The wireless nodes may be leaf nodes in one embodiment that contain a sensor. The wireless nodes are referred to as a first tier network of nodes. The first tier of nodes communicates with the infrastructure nodes. In one embodiment, they do not undertake any routing activities, i.e. any given tier 1 node does not store and forward messages from any other node in the network.

Infrastructure nodes may be coupled by a high power connection as indicated at 160. Any connection that provides suitable communications capabilities are within the meaning of connections 160. In one embodiment, the high power connection 160 may be in the form of a wireless connection, such as long range RF. The infrastructure nodes are also coupled to the central control 135 via connections 160. Connections 160 are shown in one particular arrangement, but are not intended to be limited to this type of arrangement. The infrastructure nodes are referred to as a second tier network of nodes, including their communications with the central control 135. The central control 135 may be connected to two or more infrastructure nodes, such as infrastructure nodes 112, 126 and 128. In one embodiment, the control center has redundant gateways that receive signals from infrastructure nodes, such that even the control center itself has redundancy. These gateways may be hardwire connections 175, 180, or transceivers, such as RF transceivers represented by the same reference numbers.

Wireless nodes transmit signals as represented by lines 170 emanating toward selected infrastructure nodes. For instance, wireless node 140 is shown as transmitting a signal in multiple directions as represented by lines 170. Lines 170 shows two infrastructure nodes, 112 and 116 as receiving a signal transmitted by wireless node 140. Other infrastructure nodes may be within range, but in one embodiment, the infrastructure nodes closer to the central control 135 are selected to receive and forward the signals. In another embodiment, the infrastructure nodes with the better RF link qualities are selected to receive and forward the signals. Each wireless node in FIG. 1 is represented as having its signals received by more than one infrastructure node. Some wireless node signals are only received by two infrastructure nodes, such as wireless node 152. Wireless node 152 has its signals only being received by infrastructure nodes 122 and 124. Further wireless nodes may have signals received by more than two infrastructure nodes in further embodiments.

While a limited number of wireless nodes are shown in FIG. 1 for simplicity, it should be understood that each infrastructure node may receive signals from many more wireless nodes than represented. Larger numbers of infrastructure nodes may also be used in network 100.

Figure 2:
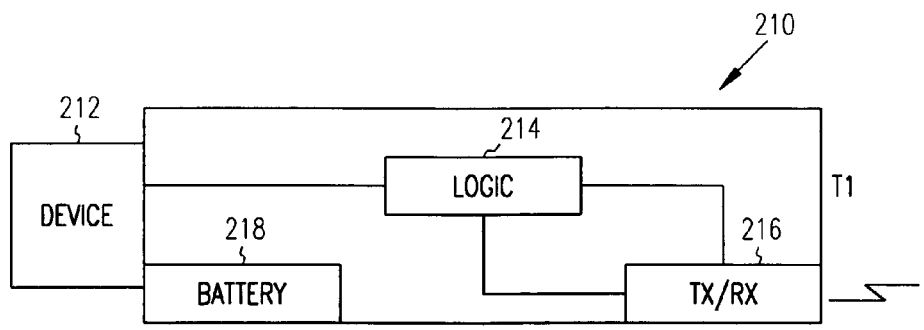
FIG. 2 is a block diagram of a typical leaf node according to an example embodiment.

The wireless leaf node is shown in further detail in FIG. 2 at 210. The leaf node 210, in one embodiment comprises a device 212, such as a motion detector, glass breakage, pressure, temperature, humidity and carbon monoxide sensor, or controller or actuator for control of motors and light among other functions. The device 212 is coupled to a logic circuit 214 which is further coupled to a low power, short range transceiver 216, which is powered by a battery 218 such as a standard 1.5 to 3 volt battery or other power source, such as solar power in one embodiment. In further embodiments, some wireless leaf nodes may be line-powered.

Logic 214 provides an indication of an event or feedback from device 212, or the status of the device to the transceiver 216, which then transmits information regarding the event. Device 212 may comprise a comparator to compare a sensed parameter with programmed limits. The limits can be set by the central control, logic 214, or can be hardwired at manufacture time. Jumper switches can also be used to set the limits. When a limit is reached or passed, an event is tripped, and a logic one or zero is provided in standard logic levels, or special low voltage logic such as CMOS TTL to logic 214. The device 212 can also be of the type that provide analog output. In that case, logic 214 also provided suitable analog to digital conversion functions. Where device 212 comprises some sort of control, logic 214 provides signals from the central control to device 212 in the proper format for execution of an action identified by the signals.

The wireless leaf node 210 transmits at a low power. Each wireless node is desirably associated with at least two infrastructure nodes. In other words, it is located close enough to the associated infrastructure nodes such that it's signal transmitted at low power can be adequately received simultaneously by the infrastructure nodes. In one embodiment, the wireless nodes are leaf nodes, but may be at any location within the network.

The signals transmitted by the sensors or wireless nodes are desirably received by multiple independent infrastructure nodes. The infrastructure nodes are spaced apart from each other, and more than one of them can receive the signals transmitted by sensors associated with a different independent infrastructure node. The combination of infrastructure nodes and associated wireless nodes provide the ability to cover/span a desired area and monitor and or control a desired environment, such as an industrial process.

Figure 3:
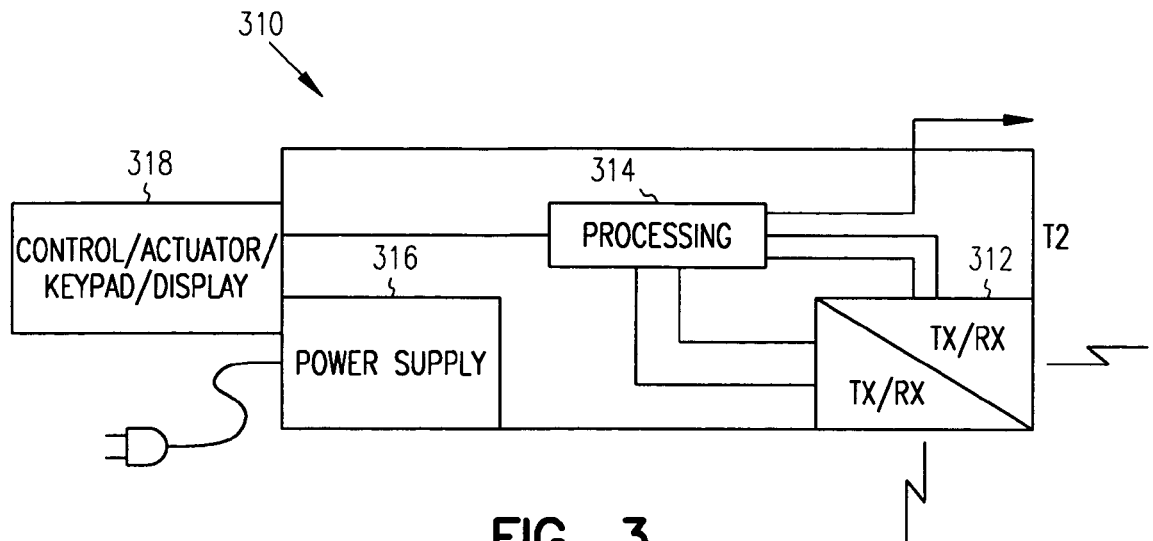
FIG. 3 is a block diagram of a typical infrastructure node according to an example embodiment.

A typical infrastructure node is shown generally at 310 in FIG. 3. Infrastructure node 310 comprises a dual transceiver 312, which receives and transmits on the first tier network at the frequency of transceiver 216 to provide communications to and from multiple wireless nodes. In one embodiment, the first tier network uses a standard communications protocol, such as a TDMA (time division/demand multiple access) or CSMA (carrier-sense multiple access), with the protocol being implemented in a known manner either in the transceiver logic 216 or logic 214 for the wireless nodes, and being implemented in either the transceiver 312 or a processing unit 314 in the infrastructure nodes. Processing unit 314 is an ASIC (application specific integrated circuit) in one embodiment, and provides data I/O functions for a high function device 318 such as an audio or video transducer, control, actuator or keypad/display device, and also provides routing functions for the information flowing through the infrastructure node.

Transceiver 312 also comprises a second tier transceiver, which transmits and receives information to and from further infrastructure nodes and the central control 135. In one embodiment, a power supply 316 is coupled to an external power source such as standard 110/220 volt AC power. The power supply 316 may also be completely batter powered, run off DC current, run off various international power levels, solar, or other supply. The power supply 316 thus provides more power than the battery 218 in device 210. Higher function device 318 is of the type that either requires more power than can easily be provided by battery, or requires higher data throughput that can only be conveniently provided by an infrastructure node 310.

The infrastructure nodes communicate with each other using a high bandwidth, long range means of communication. In one embodiment, a TDMA or CSMA based protocol can be used. In one embodiment, all the infrastructure nodes are aligned in time via pulses received over the power lines in the structure in which the monitoring system is installed. In further embodiments, timing pulses may be provided by a central infrastructure node or central control, or they are provided very accurate clocks, or other types of high bandwidth protocols may be used which do not require timing pulses.

Figure 4:
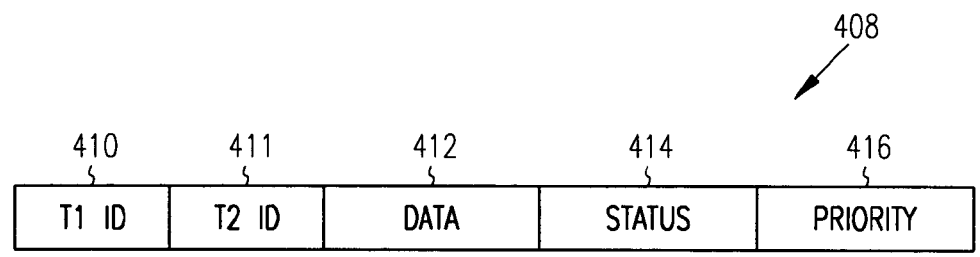
FIG. 4 is a block diagram representation of an information packet passed over a wireless mesh network according to an example embodiment.

An example embodiment of a block diagram representation of an information packet 408 passed over the multi tier network is shown in FIG. 4. A tier 1 node, or leaf node device id is indicated at 410, followed by an infrastructure node, or tier 2 node ID at 411. To increase reliability, multiple transmissions for redundancy or error detection/correction coding can be employed, altering the appearance of the data steam. Likewise, encryption can be employed to limit unintended use/reception of the system's information. These capabilities can also ensure that multiple different systems installed in close proximity to each other, such as in a condominium complex, do not incorrectly receive messages from adjacent installed systems.

The ids 410 and 411 are used in conjunction with a routing table to properly route bidirectional communications over the network. Further Ids are used to indicate further hops in the path to and from the control center 135. Data is indicated at 412. Leaf node status information is provided at 412, and infrastructure node status information is provided at 414. Finally, a priority indication may be provided at 416. The priority indication is optionally used to ensure that a particularly important communication is transmitted prior to other communications.

The information packet 408 may also be at least partially encoded to prevent others from defeating a security system implementation or otherwise interfere with communications, enables the central control 135 to determine the source of information received, and ensures that information received from two different infrastructure nodes is indeed the same/is corroborated.

Infrastructure nodes may also be coupled to a hardwired connection, such as a bus. Control center 135 may be a process control type of personal computer or other computing device capable of controlling a process.

The signals transmitted by the leaf nodes are communicated back to control center 135. The signals may travel through multiple infrastructure nodes to arrive at the control center 135. In one embodiment, the signals are relayed through non-overlapping routes to the control center 135. Signals to be transmitted are said to have a source node, and a destination node. The source node may be a leaf node or the control center, and the destination node is either the control center or a leaf node in one embodiment. Other nodes may also be originating or destination nodes.

In FIG. 1, one route for signals from leaf node 154 might be related through multiple hops, involving infrastructure nodes 124, 116 and 128 to the control center 135. A second, non-overlapping route would run through infrastructure node 126 to the control center 135. The first route may utilize a hard wired connection between infrastructure node 128 and control center 135, the second route may utilize a hard wired connection between 126 and 135. In one embodiment, the control center has redundant gateways that receive signals from infrastructure nodes, such that even the control center itself has redundancy. These gateways may be hardwire connections 175, 180, or transceivers, such as RF transceivers represented by the same reference numbers.

In one embodiment, the RF communications between nodes utilize frequency hopping-spread spectrum communication protocols.

The combination of infrastructure nodes and leaf nodes comprise a security, control or monitoring system which can be used in a structure, such as a home or business. It can also be applied to process control, where the leaf nodes comprise standard home, small business, commercial and industrial sensors, identification tags, and actuators such as motion detectors, glass breakage, pressure, temperature, humidity and carbon monoxide sensors, as well as motors and switches controlling automated systems, each equipped with a transceiver. The devices are placed throughout a structure or area to be monitored, protected or controlled. Combinations of security and control can be easily configured for a home or business in one embodiment of the system.

The infrastructure nodes communicate with each other in one embodiment over a relatively high bandwidth, using unlicensed Industrial Scientific Medical (ISM) band spread spectrum signal processors or transceivers such as those which operate in the 900 MHz, 2.4 GHz and 5.8 GHz bands of frequencies. This "tier 2" level of infrastructure nodes provides a high bandwidth communication medium over which information may be transmitted over relatively long distances and are regulated by regulatory agencies, but not licensed.

The leaf nodes, or "tier 1" nodes, are provided with low power and low bandwidth, relatively inexpensive, short range, such as on the order of approximately 3 to 6 meters, single chip transceivers operating at unlicensed frequencies such as approximately 300 or 433 MHz, which are also not directly licensed. Other frequencies may be also be used if desired, such as those used by the infrastructure nodes. Since they are low power, they do not normally transmit long distances. When used to sense conditions, or control actions of further devices such as a motor or light switch in a structure, these leaf nodes are placed where desired, but proximate a router/infrastructure node within the transmission range of the leaf node. The central control 135 is also placed conveniently for the user of the structure, but will likely not be close enough to all of the leaf nodes to adequately receive their transmissions. Infrastructure nodes are placed strategically within the structure to receive transmissions from the proximately located leaf nodes. The infrastructure nodes then forward information through potentially other infrastructure nodes to the central control. Information and commands from the central control are likewise routed back through the infrastructure nodes to the leaf nodes. A routing table is used by the infrastructure nodes to correctly route the information in the form of messages as shown in FIG. 4, in both directions.

In a further embodiment, a routing table is not required. The packet itself might contain information about the whole route, i.e. it will have information about all the intermediate hops.

Figure 5:
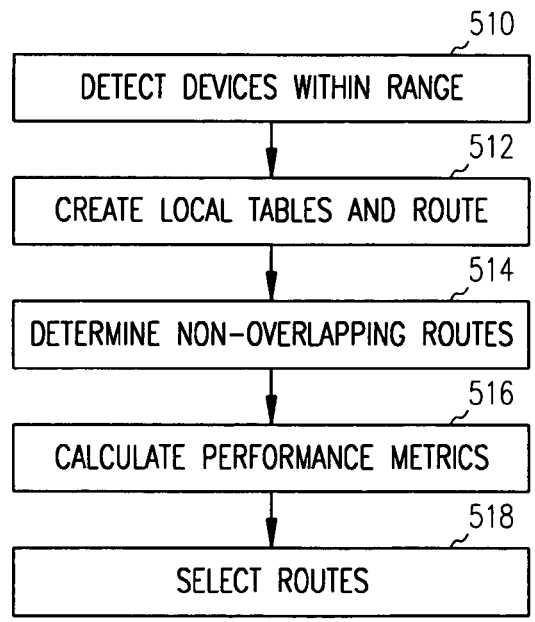
FIG. 5 is a flowchart that illustrates route discovery, and generation of a routing table that includes non-overlapping route or path selection according to an example embodiment.

FIG. 5 is an example embodiment of a flowchart that illustrates route discovery, and generation of a routing table that includes non-overlapping route or path selection. Note that in some embodiments, communications may occur in both directions between the central control 135 and leaf nodes. Thus, the routes may be thought of being between the leaf nodes and central control 135, but is commonly referred to as being from a leaf node to the central control 135. Different elements of the flowchart may be implemented at an infrastructure node or at the central control 135. On initialization of the network, or addition of a leaf node, each infrastructure node detects 510 leaf nodes that are transmitting signals within range at 210. A local router table is created that identifies the infrastructure node, and the leaf nodes from which signals are clearly received at 512. The table is then transferred through other infrastructure nodes to the central control 135.

In one embodiment, a primary infrastructure node for a leaf node communicates with the other infrastructure nodes that received the leaf node transmission to determine the routes that are already known as available from them to the control center. In further embodiments, the leaf node signal is received by multiple infrastructure nodes that retransmit the reception with an indication that they retransmitted it. This process continues with each infrastructure node transmitting toward the central control. When the retransmissions arrive at the central control, the paths they took are included, allowing the central control to identify all the routes.

The central control 135 receives all the router tables, and creates a master router table or tables based on supporting any pre-defined quality of service (QoS) or signal priority. The route discovery process calculates redundant non-overlapping routes 514 from the new leaf node to the control center. Routes are non-overlapping if they do not share any infrastructure nodes. Many different route discovery mechanisms may be utilized, such as those used in Destination-Sequenced Distance Vectoring (DSDV), Dynamic Source Routing (DSR) and Ad-Hoc On Demand Distance Vectoring (AODV).

The route discovery process may be performed by the primary infrastructure node, the central control, or other nodes, or any combination thereof in a distributed manner. The routes are calculated after taking into account the bandwidth utilization of all the intermediate infrastructure nodes for a route. This ensures that there is no transmit buffer overflow, and so no leaf node message data packets are lost during traversal of the routes.

Performance metrics for each route are calculated at 516. The performance metrics correspond to the quality of each route. The performance metric consists of the number of hops in the route, a cumulative RF link quality of the entire route, and a cumulative bandwidth utilization percentage. At 518, two routes that are non-overlapping and which have the best performance metric are selected as primary and secondary routes for the sensor. In one embodiment, the different metrics may be given different weights and then added to obtain the overall performance metric of a given route. The two routes with the top two overall performance metrics are selected. It is possible that some of these multiple routes have intermediate infrastructure nodes that are already busy most of the time transmitting data. Such paths are avoided by including the bandwidth utilization percentage in the performance metric. This ensures that there will not be major bottlenecks along the route for the sensor data to reach the control center, and transmit buffer overflows will be avoided at the intermediate infrastructure node level.

In one embodiment, the routes are selected to minimize the latency between the same message arriving by the non-overlapping routes, while taking the route quality into account. This is done by making sure that the primary and the secondary routes not only have the first and the second best performance metrics, but their performance metrics are also as close as possible to each other. When failures occur in one route or route pair, the system does not automatically re-route thereby potentially propagating the fault (in terms of additional latency). Non-affected routes continue to behave as normal. In one embodiment, human intervention is required to either repair the failures or re-route around the failures. When new routes are discovered, the latency of prior established routes is not increased beyond a preset threshold. The prior established routes may share a node with a newly proposed route.

In one embodiment, if the leaf node's signal is received by only one infrastructure node, then non-overlapping routes are calculated from this infrastructure node to the central control. In another embodiment, an infrastructure node may generate a signal, such as a sensor signal, that may need to be routed to the central control and so non-overlapping routes are calculated from this infrastructure node to the central control.

The invention claimed is:

1. A method of communicating a message from a source node to destination nodes, the method comprising: discovering a plurality of paths from the source node to the destination nodes wherein the paths contain intermediate nodes, and wherein the intermediate nodes are configured for of receiving and re-transmitting messages from other nodes; and simultaneously sending the message over two or more completely non-overlapping paths from the wireless source node to the destination nodes; wherein for any given destination node, there is at least one path from the source node to the given destination node that is completely non-overlapping with at least one other path: and wherein the message from the source node is sent to each destination node using non-overlapping paths for each destination node; wherein the paths to each destination node are selected from all possible paths based on performance metrics that correspond to a quality of the paths wherein the performance metrics comprise a number of hops in the paths, a cumulative RF (Radio Frequency) link quality of the paths, and a cumulative bandwidth utilization percentage; wherein two paths comprising overall top performance metrics are selected as a primary path and a secondary path; wherein the two paths are selected to minimize latency between a same message arriving by non-overlapping paths; and wherein the latency is minimized by selecting the two paths based on a first best performance metric and a second best performance metric; wherein the communicating of the message further comprising discovering a new path, from the source node to the given destination node to which the path has failed, that does not increase the latency beyond specified limits for the selected paths between the source node and all the destination nodes.

2. The method of claim 1, wherein the paths to each destination node are selected from all possible paths based on measured qualification criteria.

3. The method of claim 2, wherein the same paths are used for one or more subsequent messages between the source node and each of the destination nodes.

4. The method of claim 3, wherein the qualification criteria are comprised of combinations of measured latency, number of hops, link quality of one or more hops, and resource utilization at one or more nodes along the path.

5. The method of claim 4, wherein the selected paths have end to end latency values within specified limits.

6. The method of claim 5 and further comprising:
   detecting a failure in a path from the source node to one of the destination nodes; and
   continuing to use paths from the source node to each of the destination nodes that are not affected by the failure.

7. The method of claim 1 and further comprising:
   detecting a failure in a path from the source node to one of the destination nodes; and
   continuing to use paths from the source node to each of the destination nodes that are not affected by the failure.

8. The method of claim 7 and further comprising discovering a new path, from the source node to the destination node to which the path has failed, that does not increase the latency beyond the specified limits for the selected paths between the source node and all destination nodes.

9. The method of claim 8 wherein the discovered new path is non-overlapping with the prior selected paths from the source node to each of the destination nodes that are not affected by the failure.

10. The method of claim 4, wherein qualification criteria are measured recurrently for each of the selected paths.

11. The method of claim 10, wherein if the measured qualification criteria fail for a given selected path, a new path is determined.

12. The method of claim 2, wherein the path selection is recurring.

13. The method of claim 1, wherein a subset of the nodes use wireless communications.

14. The method of claim 1 wherein the method is repeated upon incremental.

15. The method of claim 1, wherein the source comprise a wireless node, and the destination comprises a control center, and wherein the wireless node is coupled to the control center via a gateway.

16. A method of communicating a message from a source node to a destination node, the method comprising: discovering a plurality of paths from the source node to the destination node wherein the paths contain intermediate nodes, and wherein the intermediate nodes are configured for of receiving and re-transmitting messages from other nodes; simultaneously sending the message over more than one completely non-overlapping path from the source node to the destination node; wherein for any given destination node, there is at least one path from the source node to the given destination node that is completely non-overlapping with at least one other path; wherein the paths to each destination node are selected from all possible paths based on performance metrics that correspond to a quality of the paths wherein the performance metrics comprise a number of hops in the paths, a cumulative RF (Radio Frequency) link quality of the paths, and a cumulative bandwidth utilization percentage; wherein two paths comprising overall top performance metrics are selected as a primary path and a secondary path; wherein the two paths are selected to minimize latency between a same message arriving by non-overlapping paths; and wherein the latency is minimized by selecting the two paths based on a first best performance metric and a second best performance metric; wherein the communicating of the message further comprising discovering a new path, from the source node to the given destination node to which the path has failed, that does not increase the latency beyond specified limits for the selected paths between the source node and all the destination nodes.

17. The method of claim 16, wherein the same paths are used for one or more subsequent messages between the source node and each of the destination nodes.

18. The method of claim 17, wherein the selected paths have end to end latency values within specified limits.

19. The method of claim 18 and further comprising:
detecting a failure in a path from the source node to one of the destination nodes; and
continuing to use paths from the source node to each of the destination nodes that are not affected by the failure.

20. The method of claim 19, wherein:
the message from the source node is sent to each destination node using one path; and
the paths from the source node to each of the destination nodes are non-overlapping.

21. The method of claim 20 and further comprising:
detecting a failure in a path from the source node to one of the destination nodes; and
continuing to use paths from the source node to each of the destination nodes that are not affected by the failure.

22. The method of claim 21 and further comprising discovering a new path, from the source node to the destination node to which the path has failed, that does not increase the latency beyond the specified limits for the selected paths between the source node and all destination nodes.

23. The method of claim 22 wherein the discovered new path is non-overlapping with the prior selected paths from the source node to each of the destination nodes that are not affected by the failure.

24. The method of claim 21, wherein qualification criteria are measured recurrently for each of the selected paths.

25. The method of claim 24, wherein if the measured qualification criteria fail for a given selected path, a new path is determined.

26. The method of claim 16, wherein the path selection is recurring.

27. The method of claim 16, wherein a subset of the nodes use wireless communications.

28. The method of claim 16 wherein the method is repeated upon incremental addition of a new source or destination node.

* * * * *